United States Patent

Amanatidis et al.

[11] Patent Number: 5,819,517
[45] Date of Patent: Oct. 13, 1998

[54] CONVEYING DEVICE FOR AGRICULTURAL PRESSES FOR COMPRESSING HARVEST PRODUCTS

[75] Inventors: Konstantinos Amanatidis, Wolfenbüttel; Dieter Wilkens, Wolflenbüttel-Ahlum, both of Germany

[73] Assignee: Welger GmbH, Wolfenbüttel, Germany

[21] Appl. No.: 763,991

[22] Filed: Dec. 12, 1996

[30] Foreign Application Priority Data

Dec. 12, 1995 [DE] Germany .................... 195 46 263.7

[51] Int. Cl.⁶ ............................................. A01D 39/00
[52] U.S. Cl. ................. 56/341; 56/13.5; 56/437; 198/723; 340/686
[58] Field of Search ............... 56/341, 343, 432, 56/437, 443, 446, 450, 13.5; 198/718, 723, 502.1, 502.2, 506, 507, 510.1, 511, 518, 861.1, 861.4, 861.5, 861.6; 340/665, 666, 679, 686

[56] References Cited

U.S. PATENT DOCUMENTS

| | | | |
|---|---|---|---|
| 2,045,081 | 6/1936 | Hart | 198/723 |
| 2,196,390 | 4/1940 | Gates | 198/723 X |
| 3,100,369 | 8/1963 | Procter | 56/13.5 |
| 3,348,678 | 10/1967 | Flowers | 198/861.5 X |
| 3,514,627 | 5/1970 | Bridgeman | 340/686 X |
| 3,556,327 | 1/1971 | Garrison | 56/13.5 X |
| 3,740,741 | 6/1973 | Jones | 340/666 |
| 4,001,613 | 1/1977 | Hills et al. | 340/676 X |
| 4,135,444 | 1/1979 | White et al. | 100/50 |
| 4,275,550 | 6/1981 | Swenson et al. | 56/341 |
| 4,411,577 | 10/1983 | Shearer, Jr. | 340/686 X |
| 4,955,188 | 9/1990 | Von Allworden | 56/341 |
| 5,519,990 | 5/1996 | Rodewald et al. | 56/341 |

FOREIGN PATENT DOCUMENTS

| | | | |
|---|---|---|---|
| 0205854 | 12/1986 | European Pat. Off. . | |
| 0339733 | 11/1989 | European Pat. Off. . | |
| 734266 | 3/1943 | Germany | 37/189 B |
| 2443838 | 9/1982 | Germany . | |
| 4102034 | 7/1992 | Germany . | |
| 4219719 | 7/1993 | Germany . | |
| 405-132138 | 5/1993 | Japan | 198/861.5 |

Primary Examiner—Randolph A. Reese
Assistant Examiner—Greg Binda
Attorney, Agent, or Firm—Anderson, Kill & Olick, P.C.

[57] ABSTRACT

A conveying device for agricultural presses for compression of harvest products and including a pick-up drum for picking up the harvest products, a conveying channel located downstream of the pick-up drum and opening into the pressing space of a press, a feeding rotor limiting the conveying channel from above, a plurality of cutting knives extending through the channel bottom, and resilient elements for supporting the channel bottom and located at an end of the channel bottom adjacent to the pick-up drum so that the bottom may be moved downward against a spring force.

12 Claims, 2 Drawing Sheets

CONVEYING DEVICE FOR AGRICULTURAL PRESSES FOR COMPRESSING HARVEST PRODUCTS

BACKGROUND OF THE INVENTION

1. Field of the Invention

The present invention relates to a conveying device for agricultural presses for compression of harvest products and having a pressing space, which device comprises a pick-up drum for picking up the harvest products, a conveying channel located downstream of the pick-up drum and an opening into the pressing space, the conveying channel having a channel bottom movable downward against an applied spring force, a feeding rotor limiting the conveying channel from above, and a plurality of cutting knives extending through the channel bottom.

2. Description of the Prior Art

European Publication EP 0205854A1 describes a conveying device for a self-loading forage box. In this forage box, for insuring normal operations and for eliminating clogging of the conveying channel, it was proposed, in case of overloading of the conveying device, to expand to a limited amount the channel bottom of the conveying channel at the outlet end of the channel, i.e., at the end adjacent to the charging space of the forage box. This is effected dependent on the rotational torque of the conveying device which is measured by a rotational torque sensor means.

However, the conveying device disclosed in this European Publication has the following drawbacks:

- the rotational torque sensor, which is formed as torque measuring device associated with a lever for opening of the conveying channel bottom, is rather complicated and expensive;
- while clogging with the crop stems of the rear portion of the conveying channel in the region in which the cutting knives extend into the channel bottom, is indeed prevented, the clogging is not prevented in the front region where the rotating feeding claws plunge somewhat vertically into the conveying channel. However, as practice has shown, it is in this region that a danger of blocking the feeding rotor exists;
- because of the stationary, fixed arrangement of the front region of the channel bottom, even small foreign particles block the rotation of the feeding rotor by being wedged between the claws and the channel bottom.

Accordingly, an object of the present is to so improve the conveying device of the above-discussed type so that the peak rotational torque is reduced when the claws plunge into the conveying channel, in particular, when the claws impact on the conveyed harvest product and on the channel bottom, to reduce blocking and possible damage of the rotor.

SUMMARY OF THE INVENTION

This and other objects of the present invention, which will become apparent hereinafter, are achieved by resiliently supporting the end of the channel bottom, which is adjacent to the pick-up drum, so that the channel bottom may be displaced downward at this end.

In this way, the channel bottom moves downward already when the claws plunge into the feeding channel, and a slight temporary blocking of the rotor takes place. At that, the foreign bodies (stones) automatically move downward, so that blocking of the feeding rotor is effectively prevented in many cases. If the front end of the channel bottom, had remained stationary, had not been displaced downward, the stones, which penetrate into the conveying channel, might have caused overloading of the feeding rotor (its shearing rapture) and a break in the operation of the apparatus. The present invention provides for a damage-free operation of known conveying and cutting devices for agricultural presses and the like. The inventive device is simple, functionally reliable, easy to manufacture, and substantially maintenance-free. With a practically "breathing" channel bottom, obtaining a substantially uniform rotational torque is insured, whereby the load on structural elements is reduced.

In order to eliminate major blocking, it is advisable to provide for pivotal movement of the channel bottom, about a pivot axis located at the end of the channel bottom which is adjacent to the pick-up drum. The pivotal movement of the channel bottom about this axis can be effected with a hydraulic cylinder connected with the outlet end of the channel bottom, or other appropriate means. Advantageously, the pivot axis is supported with a possibility of a downward movement with respect to a predetermined initial position.

According to an especially advantageous embodiment of the present invention, there is provided sensor means for measuring displacement of the channel bottom and for generating a warning signal when a load applied to the channel bottom exceeds a predetermined amount. The sensor means may be formed as an inductive proximity switch or as a resistance measuring element. The signal generated by the sensor means can be used for automatically turning off the drive of the pick-up drum.

According to a further development of the present invention, the feeding rotor is supported for a slight movement upward against a spring force applied, e.g., by a tension or compression spring. The tension or compression spring applies to the bottom channel an adjustable spring force. The applied spring force is higher when the cutting knives move into the channel bottom than when the cutting knives move out of the channel bottom.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
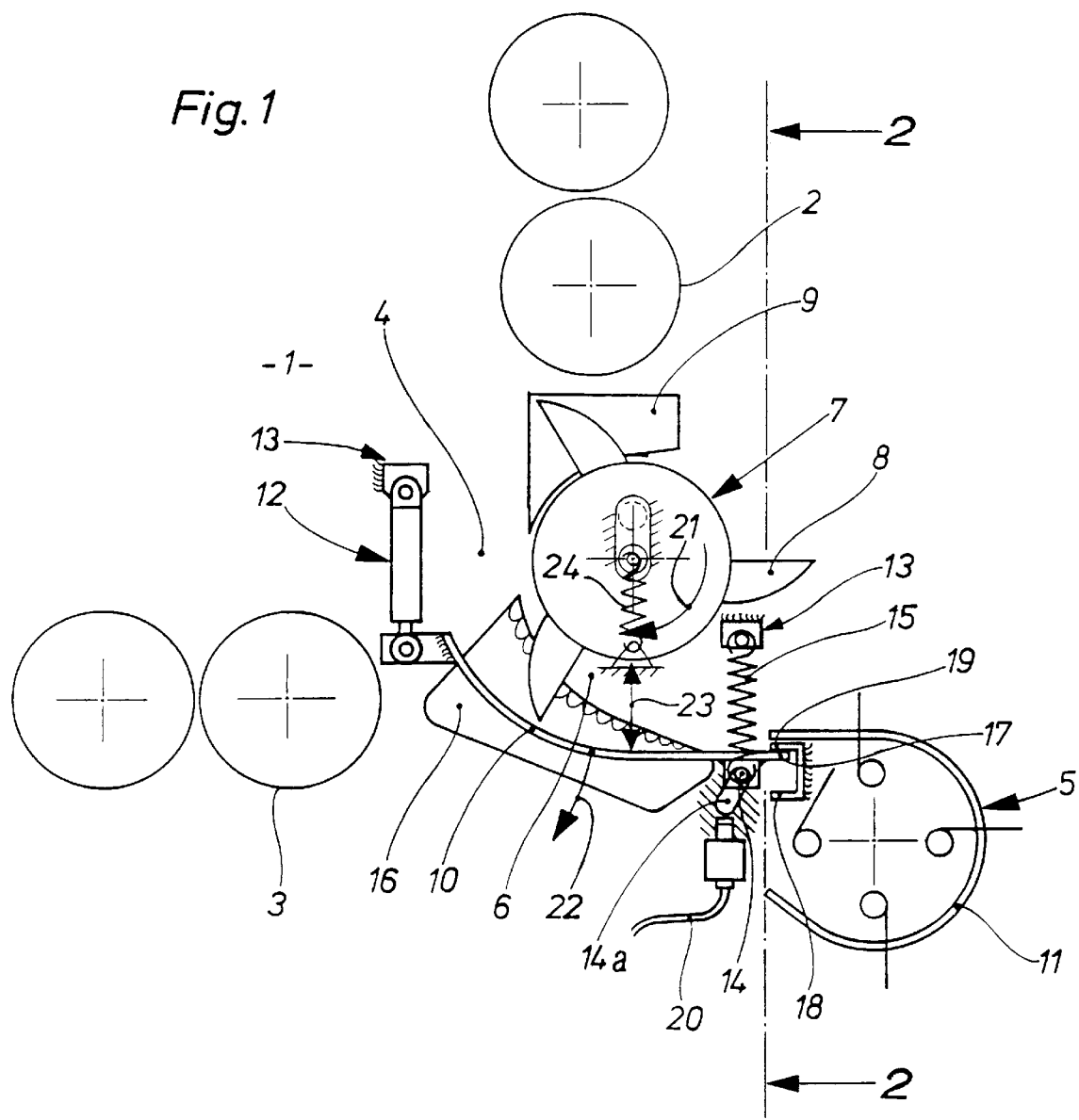
FIG. 1. shows a schematic view of the conveying device according to the present invention.
Figure 2:
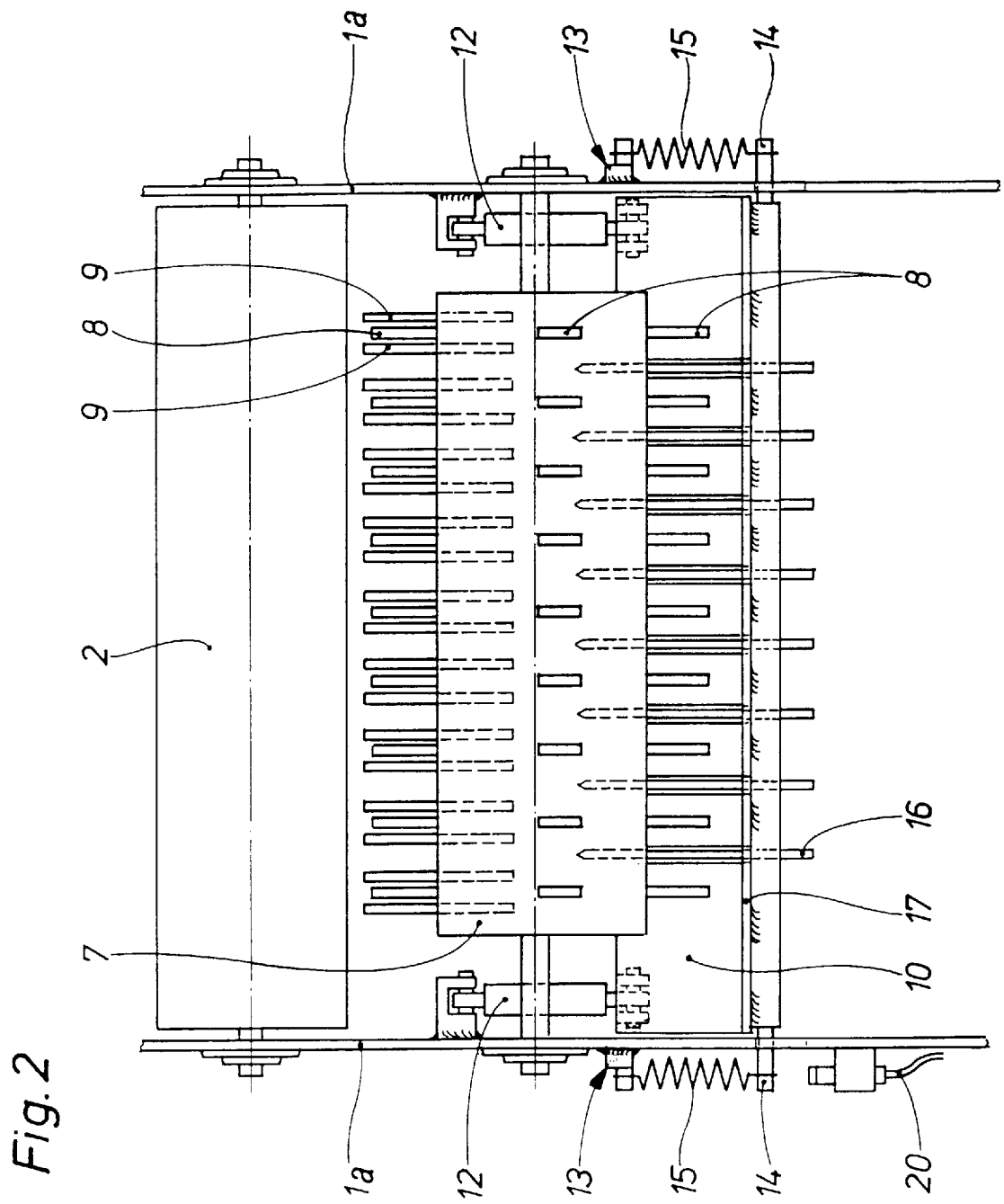
FIG. 2 shows a view along the line 2—2 in FIG. 1.

The conveying device according to the present invention can be used, for example, with a round baler which is constructed and operates as described, for example, in German patent No. 2,443,838. The baler includes, as shown in the drawing, a housing 1a defining a front region of a cylindrical pressing space 1, together with upper pressing rollers 2, lower pressing rollers 3, and a feeding opening 4 located between the upper and lower pressing rollers 2 and 3. Swath crop stems, which lie on the ground, are lifted with a pick-up drum 5 and are fed through a conveying channel 6 and the feeding opening 4 into the pressing space 1. The conveying channel 6 is limited from above by a feeding rotor 7 the circumference of which is provided with spaced from each other feeding claws 8 which cooperate with a stripping member 9. From beneath, the feeding channel 6 is closed by a channel bottom 10. The channel bottom 10 is formed as an arcuate sheet metal wall which extends from a pressing roller 3 up to beneath sheet metal segment 11 of the pick-up drum 5. In the region of the feeding opening, two hydraulic cylinder units 12, which are located on opposite sides of the channel bottom 10, connect the channel bottom 10 with the housing 13 which defines the pressing space 1. Adjacent to the pick-up drum 5, the channel bottom 10 is connected with the housing 13 by two tension springs 15, which are located on opposite sides of the channel wall and suspend respective pegs 14 welded to the channel sheet metal wall. The pegs 14 can be supported in somewhat vertical stationary slot guides 14a and form a pivot axis in order to insure that the metal sheet channel wall can be swung open, if necessary, by the hydraulic cylinders 12. The metal sheet channel wall is provided with spaced longitudinal slots through which cutting knives 16 extend. The cutting knives 16 are located in the channel bottom 10 in a position in which they engage in the clearance between the claws 8 in their circumferential path. The channel bottom 10 has a nose portion 17 projecting in the direction toward the pick-up drum 5. The nose portion cooperates with lower and upper fixed stops 18 and 19, respectively, which, if necessary, can be adjustable. A sensor 20, for example, a proximity switch with an analog indicator, is so arranged that it is activated if the channel bottom 10, upon reaching the lower stop 18 enters the operational region of the sensor 20. In the position shown in the drawings, the channel bottom 10 is lifted upward by the tension spring 15, having a predetermined tensioning force, into engagement with the upper stop 19. During the baler operation, the feeding rotor 7 is driven in the direction of arrow 21 and feed the harvest product over the cutting knives 16, where the product is cut and then fed into the pressing zone 1.

When the resistance of the feeding channel 6, which is filled with the harvested product, exceeds the drive torque of the feeding rotor 7, the rotor 7 stops. The weight of the harvest product in the channel 6 causes the channel bottom to move downward in the direction of the arrow 22, so that the distance 23 between the channel bottom 10 and the rotor 7 increases. This leads to reduction in the resistance, and the rotor 7 resumes feeding of the harvested product. In practice, the channel bottom 10 slightly expands each time the claw 8 extends into the channel 6. The lower stop 18 limits the oscillation path of the channel bottom 10. In order to indicate when the load reaches its limit, the sensor 20 generates a signal when the channel bottom 10 reaches the lower stop 18. In this way, the protection of the feeding rotor 7 from being overloaded and a trouble-free operation of the press is insured. In addition, as it has already been discussed above, the rotor 7 is supported for a slight movement upward against a biasing force applied by a spring 24, which also protects the feeding rotor 7 from being over loaded. The conveying device according to the invention can be used not only with the agricultural presses but with other equipment also, for example, with a self-loading forage box.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A conveying device for agricultural presses for compression of harvest products and having a pressing space, said device comprising:

a pick-up drum for picking the harvest products;

a conveying channel located downstream of said pick-up drum and opening into the pressing space, said conveying channel having a channel bottom;

a feeding rotor limiting said conveying channel from above and provided with feeding claws, a plurality of cutting knives extending through said channel bottom; and means for resiliently supporting said channel bottom at an end thereof adjacent to the pick-up drum in a region beneath a portion of a circular path of said feeding claws in which said feeding claws plunge into said conveying channel, said channel bottom moving automatically downward at said adjacent end against a biasing force of said resilient means when pressure of said feeding rotor on a harvest product exceeds a predetermined biasing force applied by said resiliently supporting means.

2. A conveying device as set forth in claim 1, wherein said feeding rotor is supported for a slight movement upward against a spring force.

3. A conveying device as set forth in claim 1, further comprising means located at an outlet side of said channel bottom f or pivoting said channel bottom about a pivot axis provided at an end of said channel bottom adjacent to said pick-up drum.

4. A conveying device as set forth in claim 3, wherein said pivoting means comprises hydraulic cylinder means.

5. A conveying device as set forth in claim 3, wherein said channel bottom resiliently supported in a region of the pivot axis.

6. A conveying device as set forth in claim 1, wherein said resiliently supporting means comprises spring means connected at one end thereof with said channel bottom at opposite sides of said channel bottom and connected, at another end thereof, to a stationary element.

7. A conveying device as set forth in claim 6, wherein said stationary element is one of, a housing defining the pressure space, and a load bearing element of the press.

8. A conveying device as set forth in claim 7, wherein said spring means comprises one of tension and compression springs.

9. A conveying device as set forth in claim 1, further comprising stop means for limiting downward and upward movements of said channel bottom.

10. A conveying device as set forth in claim 1, further comprising sensor means for measuring displacement of said channel bottom and for generating a warning signal when a load applied to said channel bottom exceeds a predetermined amount.

11. A conveying device as set forth in claim 10, wherein said sensor means comprises one of an inductive proximity switch and a resistance measuring element.

12. A conveying device as set forth in claim 10, wherein the signal generated by said sensor means turns off a drive of said pick-up drum.

* * * * *